(12) United States Patent
Suter et al.

(10) Patent No.: US 10,160,580 B2
(45) Date of Patent: Dec. 25, 2018

(54) LAYERED MATERIALS COMPRISING ALUMINUM FOIL AND TUBES MADE THEREFROM

(71) Applicant: Albea Americas, Inc., Washington, NJ (US)

(72) Inventors: John Suter, Bethlehem, PA (US); Michael Hoard, New York, NY (US)

(73) Assignee: Albea Americas, Inc., Washington, NJ (US)

( * ) Notice: Subject to any disclaimer, the term of this patent is extended or adjusted under 35 U.S.C. 154(b) by 668 days.

(21) Appl. No.: 14/759,854

(22) PCT Filed: Jan. 9, 2013

(86) PCT No.: PCT/US2013/020828
§ 371 (c)(1),
(2) Date: Jul. 8, 2015

(87) PCT Pub. No.: WO2014/109739
PCT Pub. Date: Jul. 17, 2014

(65) Prior Publication Data
US 2015/0336726 A1 Nov. 26, 2015

(51) Int. Cl.
| | | |
|---|---|---|
| *B65D 1/00* | (2006.01) |
| *B65D 65/40* | (2006.01) |
| *B32B 1/08* | (2006.01) |
| *B65D 65/14* | (2006.01) |
| *B65D 35/04* | (2006.01) |
| *B65D 85/00* | (2006.01) |
| *B65B 3/02* | (2006.01) |
| *B65B 7/14* | (2006.01) |
| *B32B 7/12* | (2006.01) |
| *B32B 15/085* | (2006.01) |
| *B32B 27/30* | (2006.01) |
| *B65D 35/12* | (2006.01) |
| *B32B 27/08* | (2006.01) |
| *B29C 47/00* | (2006.01) |
| *B29C 47/06* | (2006.01) |
| *B29K 23/00* | (2006.01) |

(52) U.S. Cl.
CPC ............ *B65D 65/40* (2013.01); *B32B 1/08* (2013.01); *B32B 7/12* (2013.01); *B32B 15/085* (2013.01); *B32B 27/08* (2013.01); *B32B 27/308* (2013.01); *B65B 3/027* (2013.01); *B65B 7/14* (2013.01); *B65D 35/04* (2013.01); *B65D 35/12* (2013.01); *B65D 65/14* (2013.01); *B65D 85/70* (2013.01); *B29C 47/0021* (2013.01); *B29C 47/0026* (2013.01); *B29C 47/065* (2013.01); *B29K 2023/00* (2013.01); *B32B 2307/4026* (2013.01); *B32B 2307/54* (2013.01); *B32B 2439/00* (2013.01); *B32B 2439/40* (2013.01); *B32B 2553/00* (2013.01); *Y10T 428/265* (2015.01); *Y10T 428/266* (2015.01); *Y10T 428/2804* (2015.01); *Y10T 428/2848* (2015.01)

(58) Field of Classification Search
None
See application file for complete search history.

(56) References Cited

U.S. PATENT DOCUMENTS

| | | | |
|---|---|---|---|
| 2006/0213590 A1* | 9/2006 | Danielou | C22C 21/00 148/551 |
| 2006/0257648 A1* | 11/2006 | Nageli | B32B 15/08 428/327 |
| 2012/0205267 A1 | 8/2012 | Maurice et al. | |

FOREIGN PATENT DOCUMENTS

| | | |
|---|---|---|
| EP | 0291065 A2 | 11/1988 |
| EP | 2489506 A1 | 8/2012 |
| JP | S6330842 A | 2/1988 |
| JP | 2000345122 A | 12/2000 |
| WO | 03035503 A1 | 5/2003 |
| WO | 2012110622 A1 | 8/2012 |

OTHER PUBLICATIONS

Database WPI Week 198811 Thomson Scientific, London, GB; AN 1988-075445 XP002713585.
Database WPI Week 200114 Thomson Scientific, London, GB; AN 2001-129376 XP002713583.
International Search Report and Written Opinion—PCT/US2013/020828—dated Oct. 18, 2013.
Database EPODOC [Online] European Patent Office, The Hague, NL; XP002713586.
Database EPODOC [Online] European Patent Office, The Hague, NL; XP002713584.

* cited by examiner

*Primary Examiner* — Robert T Butcher
(74) *Attorney, Agent, or Firm* — Banner & Witcoff, Ltd.

(57) ABSTRACT

Multi-layer laminate materials, which include an aluminum foil layer having particular tensile strength properties, are described. The aluminum foil layer in combination with other layers provides important benefits in manufacturing operations, such as filling tubes made by forming a cylinder from the laminate materials and heat sealing the side and end edges. These benefits are obtained in many cases without the need to increase foil weight or layer thickness. The laminate materials preserve the flexibility of conventional tubes, for example toothpaste tubes, as required to dispense products from a tube opening with the application of manual squeezing forces.

20 Claims, 3 Drawing Sheets

LAYERED MATERIALS COMPRISING ALUMINUM FOIL AND TUBES MADE THEREFROM

CROSS-REFERENCE TO RELATED APPLICATIONS

The present application is a U.S. National Phase filing of International Application No. PCT/US2013/020828, filed on Jan. 9, 2013, which is incorporated by reference herein in its entirety.

FIELD OF THE INVENTION

The present invention relates to multi-layer laminate material, including laminates comprising an aluminum foil layer in combination with additional, surrounding layers, such as layers of a base film on one side of the foil layer and a sealing layer on the opposite side. The aluminum foil has a tensile strength that provides improved performance in manufacturing (e.g., tube filling) operations.

DESCRIPTION OF RELATED ART

Multi-layer laminate materials comprising polymer layers are used throughout the packaging industry. One important use for such laminates is in the manufacture of dispensing tubes for containing soft, formable products (e.g., toothpastes, cosmetics, and topical ointments) that a user can dispense by squeezing them through a tube opening. In the case of toothpaste tubes, for example, a laminate sheet material is typically formed into an elongated tube shape having a substantially circular or oval cross section. One end may then be attached (e.g., by heat sealing) to a tube head, typically of a rigid plastic material, for dispensing product and also isolating the product from the outside environment (e.g., by capping) when not in use. Prior to being filled with product, the open tubes are sanitized/purged by subjecting them to vacuum and/or blowing with high pressure air. The end that is fitted with the tube head is pointed downward, thereby orienting the open end upward for filling. The tubes may then be advanced through the assembly line, past a device that optically checks alignment and rotates the tubes if necessary. A filling machine causes a pump to descend down upon the open tubes, filling them with product. Finally, the filled dispensing tubes are sealed shut at their open ends (e.g., by crimping), and often stamped with identifying product information.

Throughout the filling and handling of conventional tubes, their flexible material characteristics, although desirable from a product dispensing standpoint, are susceptible to defects such as denting, bending, buckling, and collapse. This detracts from the appearance of the finished tubes and/or results in costly manufacturing stoppage, or "downtime," as needed to remove the affected tubes before being filled in their defective condition and/or before their shipment to the retailer. For a given laminate sheet material, the frequency of occurrence of such defects generally increases with increasing production rates (i.e., tubes filled per minute), as well as increasing tube thickness. For these reasons, there exists a need in the art for dispensing tubes, and associated materials for making such tubes, that decreases the occurrence of manufacturing defects, and particularly at high production rates, without adding significantly to overall material costs.

SUMMARY OF THE INVENTION

The present invention is associated with the discovery of multi-layer laminate materials useful in product packaging. These materials are particularly applicable for packaging viscous, flowable products that can be squeezed through an opening of the package. Therefore, deformable packages made from multi-layer laminate materials described herein, can dispense product when subjected to manual pressure or squeezing forces by a user. Representative products are "semi-solids" that behave as solids and exhibit no flow, unless a sufficient stress is applied, such as manual squeezing forces applied by a user. In general, therefore, such products do not flow out of their container, even when the container is opened and turned upside down, in the absence of a force acting to constrict the container volume and thereby compress the product out through an opening.

Suitable products are polymeric cross-linked systems such as gels, as well as organic- or aqueous-based based suspensions of solid particulates such as pastes. Viscous emulsions, having either an organic or aqueous continuous phase, are also representative of suitable semi-solid products, with particular examples being ointments, lotions, and creams. Toothpastes and other orally applied agents (e.g., denture adhesives), as well as topically applied agents such as pharmaceutical preparations, are specific examples of products. Toothpastes are particularly well known for exhibiting the property of being removable or dispensable from a tubular container opening, normally with only a minimal or moderate amount of compressive forces being exerted by a user. In contrast to other products, toothpastes are generally formulated to liquefy after application (following exposure to the physiological temperature of the oral environment). Additional products include food products that exhibit the general properties discussed above, for example in the form of pastes (e.g., tomato paste), sauces (e.g., apple sauce), purees (e.g., hummus), emulsions (e.g., peanut butter), etc. Further products include polymerizable products that are semi-solids, as defined above, while stored in the container, but harden or solidify (e.g., via cross-linking or curing reactions) upon exposure to air. Caulks, sealants, and adhesives are specific examples.

Particular aspects of the invention relate to the use of the multi-layer laminates described herein in an overall manufacturing process for packaging any of the products described above. The laminates may be formed, for example, into open-ended tubes by rolling a flat section of the laminate and joining overlapping side and end portions with, respectively, a lengthwise lap seal and a widthwise fin seal. Prior to filling, such tubes may be optionally fitted with a tube head at an open end, opposite the end that is or will ultimately be sealed with the fin seal. In any event, such open-ended tubes are typically subjected to a number of forces, acting both externally (e.g., in their handling/movement along an assembly line) and internally (e.g., during their filling with product) as they move through successive stages of product packaging. Because the tubes in their normal packaging service are generally deformable to allow product dispensing, they are also easily dented during manufacturing. Moreover, the performance of current high speed assembly lines, for manufacturing and packaging products as described above in laminate tube containers, is sensitive to the rate of defects (e.g., dents) in these containers. Product manufactures generally will not tolerate such defects in tubular (e.g., toothpaste) containers, as they give the newly-packaged products the appearance of having been partially used. Defective tubes must therefore be removed from the manufacturing line, normally by temporarily suspending production. This, however, results in significant expenses associated with losses in both manufacturing time and materials. Furthermore, the susceptibility of tubular containers to denting during manufacturing increases dramatically with increasing tube diameter.

The multi-layer laminate materials described herein are useful for forming tubes, including dispensing tubes having an attached tube head, with a surprisingly high resistance to denting and other defects, during the packaging of products (e.g., the filling of toothpaste tubes), having a viscosity and other characteristics suitable for being dispensed through a tubular container. Importantly, this reduction in defects is achieved without a corresponding increase in the cost of the multi-layer laminate material compared to conventional materials, and in fact material costs are often reduced in conjunction with the improved performance. These surprising and important commercial benefits are particularly significant in the packaging of products with characteristics (e.g., viscosity) of toothpaste which subject the tubular container to defined, outward stresses upon filling. Thus, packaged products comprising tubes as described herein are particularly advantageous in combination with a toothpaste or product of similar viscosity, in terms the benefits described above. According to preferred embodiments directed to packaged products, therefore, the product contained in the multi-layer laminate material (e.g., in the form of a tube) has a viscosity generally in the range from about 5 to about 200 pascal seconds (Pa·s), typically from about 10 to about 150 Pa·s, and often from about 50 to about 100 Pa·s.

Embodiments of the invention are directed to multi-layer laminate materials having improved packaging properties, including improved filling properties, for example when used in the form of tubes into which product is filled according to a packaging process as described above. Representative laminate materials comprise, in order, (a) a base film having one or more layers of a polyolefin (e.g., one or more polyethylene layers), (b) an aluminum foil layer, and (c) a sealing layer (e.g., comprising a polyolefin such as polyethylene). Advantageously, the aluminum foil layer has a tensile strength of broadly at least about 50 megapascals (MPa), for example typically from about 50 to about 150 MPa, and often from about 70 to about 90 MPa. In a standard tensile testing apparatus (either a hydraulic or electromechanical machine) representative multi-layer laminate materials exhibit a peak load to failure of at least about 8.0 kg (e.g., from about 8.0 kg to about 12 kg, or from about 8.5 kg to about 11 kg) at a crosshead speed of 127 mm/min.

Importantly, it has been discovered that the tensile strength of the aluminum layer plays an important role in the resistance of tubular packaging containers to dents and other defects in the assembly of packaged products. Moreover, laminates having an aluminum foil layer with a tensile strength as described herein provide these noted advantages without exceeding the costs of conventional materials. In fact, in many cases these advantages are obtained even when material costs are reduced, for example by virtue of the multi-layer laminate material having a thinner aluminum layer and/or an overall reduced thickness, which might result from reducing the thickness of one or more non-aluminum layers.

According to preferred embodiments, the aluminum foil layer has a thickness generally from about 2 to about 35 microns (µm), typically from about 6 to about 20 µm, and often from about 10 to about 15 µm, and a tensile strength as discussed above. Thicknesses and tensile strengths in these ranges provide an advantageous combination of strength and material cost properties, leading to the benefits described herein, and particularly a reduced occurrence of defects during packaging operations with tubular packaging containers. In many cases, the tensile strength properties of the aluminum foil layer, leading to enhanced packaging performance as described above, allows the overall thickness of the multi-layer laminate material to be reduced. Representative laminate materials, for example, have a total thickness (i.e., thickness of all of the layers combined, or average total thickness in cases where one or more of the layer thicknesses are not constant) of less than 330 µm, with representative thicknesses being in the range from about 150 µm to about 330 µm. In further embodiments, laminate material thicknesses may be less than 275 µm (e.g., generally from about 100 µm to about 275 µm, typically from about 150 µm to about 275 µm, and often from about 200 µm to about 275 µm). According to particular embodiments in which additional layers are used, as described in greater detail below, these ranges are representative of the total thickness of the laminate material, including such additional layers. According to other embodiments in which such additional layers are used, these ranges are representative of the combined thickness of only the base film, compatibility layer, foil layer, and sealant layers, in addition to any optional adhesive layers.

In general, the outer base film (e.g., comprising multiple individual polyethylene or polypropylene layers) has a thickness that exceeds that of either or both of the aluminum foil layer and the sealant layer individually, and often exceeds that of these layers in combination. According to representative embodiments, the base film has a thickness of broadly at least about 50 µmm for example from about 50 µm to about 250 µm, typically from about 75 to about 200 µm, and often from about 100 µm to about 175 µm.

The multi-layer laminate material may have various layers in addition to the aluminum foil layer, the sealing layer, and the layers of the base film. For example, one or more adhesive layers may be incorporated to improve layer bonding and therefore be disposed (e.g., in the case of a first adhesive layer) between the aluminum foil layer and an inner layer of the polyolefin base film and/or be disposed (e.g., in the case of a second adhesive layer) between the aluminum foil layer and the sealing layer. Representative adhesive layers comprise olefin-acrylic acid copolymers (e.g., ethylene-acrylic acid copolymers). Alternatively, or in addition, to such adhesive layer(s), other layers may be added to improve compatibility between the resulting, adjacent layers of the laminate material. Therefore, in the case of using both first and second ethylene-acrylic acid adhesive layers in a laminate as noted above, a polyolefin (e.g., polyethylene such as low density polyethylene (LDPE)) compatibility layer may be disposed between the inner layer of the polyolefin base film and the first adhesive layer.

A further important aspect relates to tubes formed from the laminate materials described herein, having relatively large diameters (or relatively large average diameters in the case of tube diameters that are not constant over the tube length), generally of at least about 25 mm (e.g., generally from about 25 mm to about 150 mm, typically from about 25 mm to about 100 mm, and often from about 25 mm to about 75 mm). Such tubes are normally used to contain a significant quantity of a semi-solid product as described above, for example at least about 60 milliliters (ml) (e.g., generally from about 60 ml to about 2 liters (l), typically from about 60 ml to about 1 liter, and often from about 150 ml to about 500 ml), with these values likewise corresponding to the internal volume of the tubes. With conventional laminate materials, packaging operations in which such relatively large diameter tubes are filled with the types of semi-solid products described above (e.g., toothpaste or other products with viscosities and other characteristics as described above) are compromised due to the pronounced susceptibility of the tubes to incurring defects such as denting, bending, buckling, and collapse. Therefore, the laminate materials described herein offer particularly important benefits when used in the packaging of products with the flow characteristics and viscosities noted above, in tubes having these diameters and/or internal volumes.

Further embodiments of the invention are directed to tubes comprising multi-layer laminate materials described herein. Such tubes are generally formed using at least two seals, namely a lap seal and a fin seal. According to a particular embodiment, for example, overlapping portions of the sealing layer and an outer layer of the polyolefin base film are bonded to form a lap seal over at least a portion of the length of the tube, and overlapping portions of the sealing layer are bonded to form a fin seal over at least a portion of the width of the tube. Further embodiments are directed to dispensing tubes, in which such tubes, comprising a multi-layer laminate material, also include a tube head, as described in greater detail below, which is attached to an open end of the tube.

In the case of tubes formed in the manner described herein, the sealing layer faces the interior of the tube and directly contacts the product. Therefore, packaged products according to yet further embodiments of the invention comprise tubes (formed from the multi-layer laminate materials) as described herein containing, in the interior of the tube, a product (e.g., an oral or topical product) for example having the viscosity and other characteristics as described above, wherein the product contacts non-overlapping portions of the sealing layer. In a preferred embodiment, the product has solid characteristics (e.g., does not flow) when disposed in the tube and is also removable through an opening in the tube with the application of manual compressive force. Representative products are in the form of a gel, a paste, an ointment, a lotion, or a cream.

Accordingly, yet further embodiments are directed to methods of preparing a packaged product comprising filling the tubes described herein with these products, for example in an automated packaging process. Such methods may also comprise, prior to filling the tube, preparing the tube from a multi-layer laminate material as described herein by bonding (i) overlapping portions of the sealing layer and an outer layer of the polyolefin base film to form a lap seal over at least a portion of the length of the tube, and (ii) overlapping portions of the sealing layer to form a fin seal over at least a portion of the width of the tube. The bonding of (i) and (ii) is generally carried out by applying pressure between the overlapping portions in each case (e.g., by placing the overlapping portions between opposing plates of a press), and often by applying a combination of heat and pressure (e.g., using a heated press). In the case of the product being packaged in a dispensing tube according these representative methods, the methods may further comprise, prior to or after filling, bonding a tube head (e.g., comprising a rigid plastic material) to an open end of the tube. This bonding may be carried out by heat sealing overlapping portions, for example a lower shoulder portion of the tube head and an upper portion of the open end of the tube, as discussed in greater detail below.

These and other embodiments and aspects relating to the present invention are apparent from the following Detailed Description.

Figure 1:
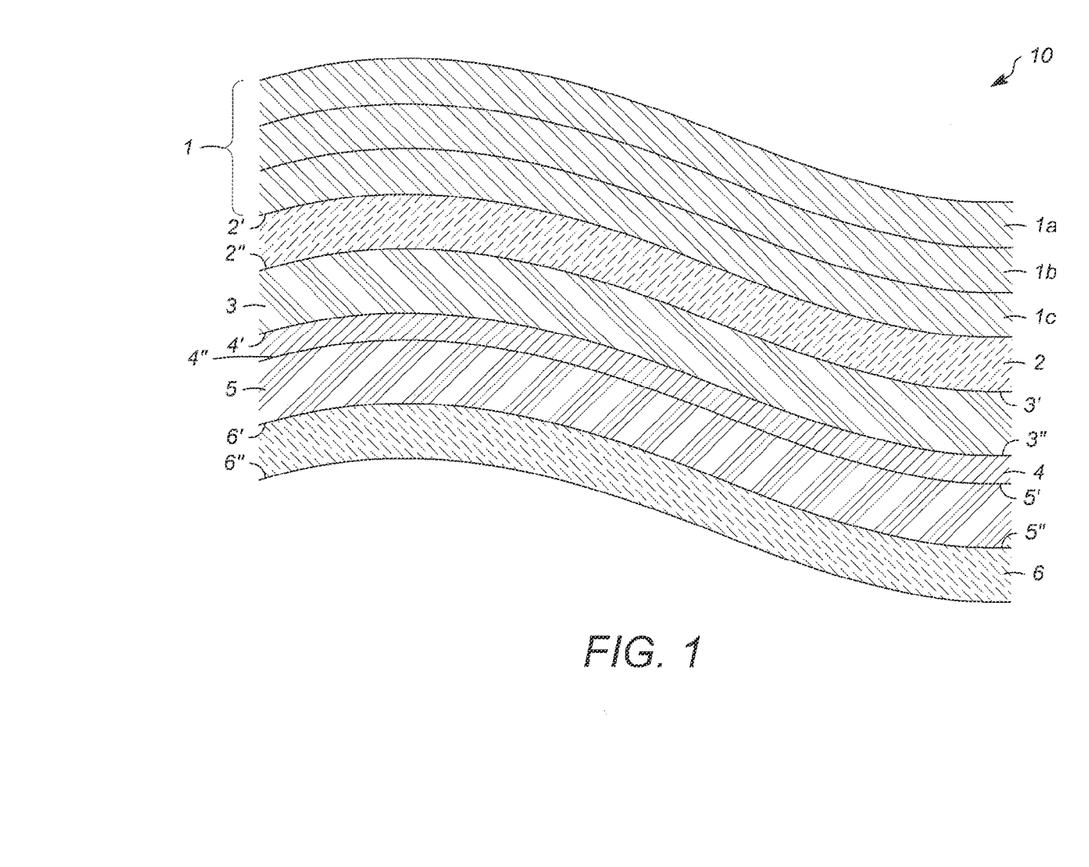
FIG. 1 depicts the layer structure of a representative multi-layer laminate material having a layer of aluminum foil.
Figure 2:
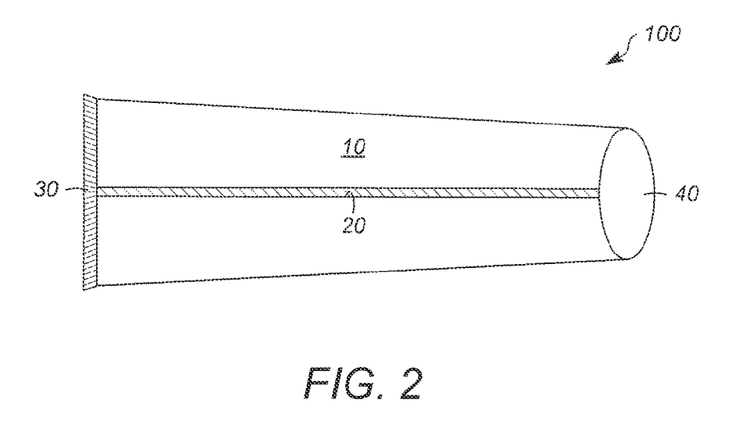
FIG. 2 depicts a tubular container, open at one end where a tube head is normally attached, with the container being sealed at its sides and bottom using lap and fin seals, respectively.
Figure 3:
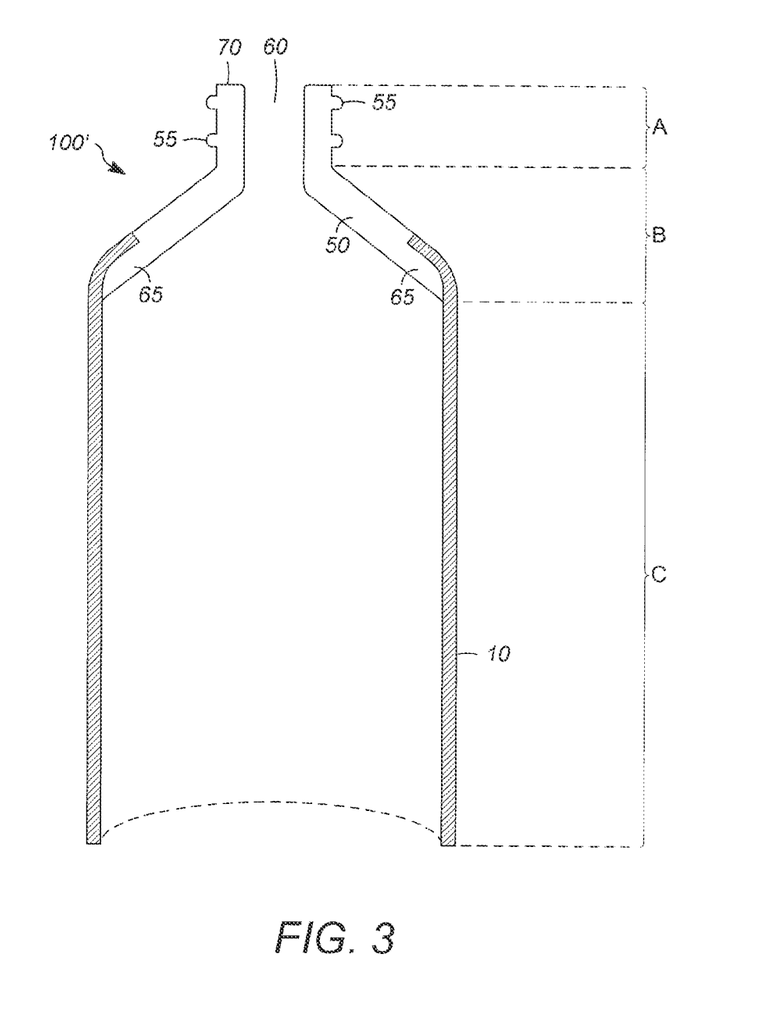
FIG. 3 depicts a cross-sectional cut out view of the tubular container of FIG. 2, with an attached tube head to provide a dispensing tube.

The features referred to in FIGS. 1-3 are not necessarily drawn to scale and should be understood to present an illustration of the invention and/or principles involved. Multi-layer laminate materials and containers made from such materials, according to other embodiments of the invention, will have configurations, components, and other features determined, in part, by the intended application in which they are used.

DETAILED DESCRIPTION

The present invention is associated with the discovery of important commercial benefits of multi-layer laminate materials, having an aluminum foil layer with particular strength properties. These benefits can be obtained in many cases without the need to increase foil weight and/or overall laminate material weight. In fact, the desired performance, in terms of the reduction in the occurrence of tube denting or other defects, during processing of tubes made from the laminate materials through a filling operation, is attainable with multi-layer laminate materials having a lower overall thickness compared to conventional packaging materials. This ability to maintain or even reduce the overall packaging weight and/or thickness is significant in terms the objectives of not only lowering material costs, but also preserving sufficient flexibility of the multi-layer laminate materials such that it can be used to dispense products as described above with the application of only manual squeezing forces.

FIG. 1 illustrates a flexible, multi-layer laminate material 10 comprising aluminum foil layer 4 having a tensile strength as discussed above which, in combination with additional layers, including surrounding layers, 1a, 1b, 1c of base film 1 and sealing layer 6, contributes to the advantages of multi-layer laminate material 10 in undergoing packaging and filling operations with reduced susceptibility to denting or other defects. The property of foil tensile strength can be adjusted for given application by varying parameters, including annealing conditions (e.g., time and temperature), having effects that are understood in the art of aluminum production. Also included in the particular embodiment illustrated in FIG. 1 are adhesive layers 3,5 on either side of aluminum foil layer 4, which may be used to provide better adherence between the metal and nonmetal layers than would otherwise be achieved. Additionally, the use of compatibility layer 2 improves layer cohesion between layers of dissimilar materials that would otherwise be in contact. Improved cohesion results, for example, in the case of using compatibility layer 2 comprising polyethylene positioned between relatively less compatible layers (compared to their mutual cohesiveness with layer 2). In the case of the embodiment illustrated in FIG. 1, compatibility layer 2 is positioned between inner layer 1c of base film 1, for example comprising polypropylene, and adhesive layer 3, for example comprising ethylene acrylic acid copolymer. Polymer blends (e.g., a polypropylene/polyethylene blend) may often be advantageously used in compatibility layer 2, with the relative amounts of the blend components being adjusted to optimize layer cohesion.

Any number of additional layers (not shown) may be included in the multi-layer laminate materials described herein, comprising a base film, an aluminum foil layer, and a sealing layer, for example as in the multi-layer laminate material 10 of FIG. 1. Representative additional layers include oxygen and moisture barrier layers (e.g., ethylene vinyl alcohol (EVOH), a polyvinylidene chloride copolymer (VDC-CP) such as a vinylidene chloride methyl acrylate (VDC-MA) copolymer), pigment layers, dye layers, and abuse or resistant layers.

The phrase "in order," as it pertains to layers of a multi-layer laminate material refers to the relative positioning of the specified layers from one material surface to its opposite surface, even though the presence of additional layers is not precluded. Therefore, a multi-layer laminate material comprising, in order, a base film, an aluminum foil layer, and a sealing layer requires that the aluminum foil layer be positioned between the base film and sealing layer, although other layers may be present. The order of layers may also be particularly specified "in order from the exterior to the interior of the laminate material," which refers to the ordering of films and/or layers of the multi-layer laminate material, as positioned in a container from which it is formed. In this case, the first mentioned film or layer is positioned more closely to the exterior or outer surface of the multi-layer laminate material (or further from the interior or inner surface) than the other mentioned layers, and the last mentioned film or layer is positioned more closely to the interior or inner surface of the multi-layer laminate material (or further from the exterior or outer surface) than the other mentioned layers.

In general, when the multi-layer laminate material is formed into a packaging container such as a tube, the sealing layer contacts the product contained in the tube, or is at least positioned closest to the product and interior of the container, relative to the aluminum foil layer and layers of the base film. The interior or inner surface of the container refers to the surface that faces the inside of the container and contacts product when the container is filled. The exterior or outer surface of the container refers to the surface that faces the outside of the container and is opposite the interior of the container. The terms "inner" and "outer," when used to describe a layer or surface, designate a relative position of that layer or surface with respect to others, in terms of its proximity to the interior or exterior of a container formed from a given multi-layer laminate material.

Thus, FIG. 1 illustrates a multi-layer laminate material 10 comprising, in order, base film 1, aluminum foil layer 4, and sealing layer 6. As illustrated in FIGS. 2 and 3, a tubular container 100, 100' may be formed from this multi-layer laminate material 10. In such a container, sealing layer 6 (FIG. 1) may be the closest layer to the interior of the laminate material (e.g., the layer contacts the product when the container is filled). In this case, adhesive layers 3,5 of FIG. 1 may be referred to as outer and inner adhesive layers, respectively, in which outer adhesive layer 3 is positioned more closely to the exterior of the container, compared to inner adhesive layer 5. Similarly, for example, with this orientation of laminate material layers in the formed container, compatibility layer 2 can be said to have an outer surface 2' that contacts inner layer 1c of base film 1 and an inner surface 2" that contacts outer surface 3' of outer adhesive layer 3. In this manner, it is possible to define compatibility layer outer surface 2', compatibility layer inner surface 2", outer adhesive layer outer surface 3', outer adhesive layer inner surface 3", aluminum foil layer outer surface 4', aluminum foil layer inner surface 4", inner adhesive layer outer surface 5', inner adhesive layer inner surface 5", sealing layer outer surface 6', and sealing layer inner surface 6". Further characteristics of various layers other than the aluminum foil layer, according to preferred embodiments, are set forth below.

As illustrated in FIG. 2, container 100 (e.g., a tube for dispensing toothpaste or other product as described above) may be formed from multi-layer laminate material 10, for example by rolling it into a cylindrical shape, possibly having a taper as shown in FIG. 2. Lengthwise lap seal 20 and widthwise fin seal 30 are formed using sufficient pressure, normally in combination with heating, to bond inner sealing layer 6 (FIG. 1) to itself or other layers of laminate 10, with sufficient strength to withstand subsequent filling of container 100 with product through its open end 40. According to alternative embodiments, prior to filling, container 100 may be fitted at open end 40 with a tube head (not shown in FIG. 2), which usually comprises a relatively hard plastic material, for dispensing product from one end. Regardless of when the tube head is fitted, the container may be filled before or after formation of the widthwise fin seal that seals the product within the container. Additional characteristics of multi-layer laminate material 10, in terms of possible layer configurations, layer compositions, and layer thicknesses, are discussed in greater detail below.

Base Film

The base film is generally thicker than all layers of the multi-layer laminate material. The base film may be a single layer comprising a polyolefin or a blend of polyolefins, although in many cases the base film comprises two or more of such layers (e.g., three layers, four layers, five layers, or six layers), for example with each layer comprising polyethylene or polypropylene. Normally, these layers of the base film are coextruded, and in many cases may be coextruded, blown film layers. According to representative embodiments, each of the one or more layers of the base film comprises at least about 70%, at least about 85%, or substantially all (e.g., at least about 95%) of a polyolefin such as polyethylene or polypropylene, including high density polyethylene (HDPE), linear low density polyethylene (LL-DPE), medium density polyethylene (MDPE), very low density polyethylene (VLDPE), ultra low density polyethylene (ULDPE), and propylene-ethylene (PPE) copolymers. Other polyolefins include copolymers of ethylene or propylene with another olefin (e.g., butane, pentene, hexane, octane, methyl or pentene, and particularly an alpha-olefin). A particular example of a base film is a two-layer structure having layers of LDPE and HDPE, with a predominance by weight (e.g., at least about 50%, and often at least about 75%) of the HDPE layer.

One or more layers of the base film may also comprise a blend of polyolefins. Representative blends of polyolefins include polypropylene/polyethylene blends and polypropylene/ethylene vinyl acetate (EVA) blends, with relative amounts of blending components determining the overall chemical characteristics of a given blend, including its compatibility with adjacent layers. Also included in the definition of polyolefins are copolymers of olefins, especially ethylene and propylene, and non-olefinic comonomers that are copolymerizable with the olefin. Exemplary non-olefinic comonomers are vinyl monomers and unsaturated carboxylic acids (e.g., maleic acid, fumaric acid) or their derivatives, for example their anhydride derivatives or ester metal salt derivatives. Particular examples of polyolefins therefore include ethylene vinyl acetate (EVA), ethylene normal butyl acrylate (ENBA), ethylene methyl acrylic acid (EMAA), ethylene methyl acrylate (EMA) and others.

Representative layer thicknesses of the layers of the base film are generally from about 5 μm to about 80 μm, typically from about 10 µm to about 50 µm, and often from about 20 µm to about 40 µm. The layer thicknesses may be substantially equal or may vary. According to particular embodiments, the base film comprises two or three layers of blown polyethylene or polypropylene, each of which has a layer thickness in any of these ranges. Representative ranges of total thicknesses of the base film (i.e., the sum of the thicknesses of the individual base film layers), are as discussed above.

The base film, or at least one layer of this film, may also be printable such that it may contain printed matter, for example product information including the manufacturer and brand name, instructions for use, ingredients, etc. In the representative embodiment described above, in which the base film comprises layers of LDPE and HDPE, the LDPE can serve as a print surface in the formed tube. The base film may be the natural color of the component layer(s), or such layer(s) may alternatively contain a colorant such as a pigment or a dye. Suitable colorants may be incorporated as a color concentrate, in a polymer blend. In the case of coextrusion of two or more base film layers, the color concentrate is then generally diluted during the coextrusion as a result of mixing with the polymer(s) of the layer in which the colorant is contained. Preferably the underlying polymer used for the color concentrate is the same as, or at least compatible with, a polymer used in the base film layer(s) (e.g., a polyolefin) in which into which the colorant is contained. A suitable color concentrate is a white pigment in an underlying polypropylene or polyethylene polymer, or polymer blend comprising a polypropylene or polyethylene polymer.

Compatibility Layer

One or more compatibility layers may be incorporated into the multi-layer laminate material, between two layers of chemically distinct compositions, to improve layer cohesion where desirable. According to representative embodiments, the compatibility layer will comprise at least one homopolymer or copolymer of a monomer that is also present in at least one, and possibly both, of its adjacent layers. To provide sufficient compatibility properties, the amount of such homopolymer(s) or copolymer(s) having this/these characteristic(s) (i.e., being a homopolymer or copolymer of a monomer that is also present in at least one of the adjacent layers) is/are present in the compatibility layer, by weight, in an amount of generally at least about 70%, typically at least about 85%, and often at least about 95%.

For example, in the representative embodiment depicted in FIG. 1, compatibility layer 2 is disposed between adjacent adhesive layer 3 and layer 1c of base film 1. According to a preferred embodiment as discussed below, adhesive layer 3 may comprise ethylene acrylic acid (EAA) copolymer, for example in an amount of at least about 70% by weight. In this case, in view of ethylene being a monomer of EAA copolymer, compatibility layer 2 may comprise polyethylene, for example as low density polyethylene (LDPE) in an amount as described above. Other suitable homopolymers and copolymers, for use in a compatibility layer adjacent one or two layers comprising a homopolymer or copolymer of ethylene, include high density polyethylene (HDPE), linear low density polyethylene (LLDPE), medium density polyethylene (MDPE), very low density polyethylene (VLDPE), ultra low density polyethylene (ULDPE), propylene-ethylene (PPE) copolymers, ethylene vinyl acetate (EVA), ethylene normal butyl acrylate (ENBA), ethylene methyl acrylic acid (EMAA), ethylene methyl acrylate (EMA) and others. Representative compatibility layers have, independently, thicknesses generally from about 15 µm to about 60 µm and often from about 20 µm to about 45 µm, in order to promote good compatibility with their immediate adjacent layers.

Adhesive Layers

As discussed above, one or more adhesive layers may be incorporated into the multi-layer laminate material to improve adhesion between layers surrounding (i.e., immediately adjacent or sandwiching) the adhesive layer. In representative embodiments, each of the one or more adhesive layers independently comprises, by weight, at least about 70%, at least about 85%, or substantially all (e.g., at least about 95%) of an olefin-acrylic acid copolymer. Suitable copolymers of this type include ethylene acrylic acid (EAA), ethylene normal butyl acrylate (ENBA) copolymer, ethylene methyl acrylic acid (EMAA) copolymer, and ethylene methyl acrylate (EMA). In addition to, or in place of, an olefin-acrylic acid copolymer, the adhesive layer can comprise one or more thermoplastic hot melt adhesives, including polyethylene (e.g., low density polyethylene (LDPE)), polyamides, and/or EVA copolymers such as anhydride modified EVA. Other representative adhesive layers, or components thereof, include rubber-based adhesives, polyurethanes, and cyanoacrylates. A preferred adhesive layer comprises EAA. Representative adhesive layers have, independently, thicknesses generally from about 10 µm to about 50 µm and often from about 15 µm to about 40 µm, in order to promote good bonding properties.

Sealing Layer

In forming containers from multi-layer laminate materials as described herein, the sealing layer is often involved in the bonding with itself or other layers to provide adequate seals such that the formed container can be subsequently filled without product leakage, particularly over extended periods of storage by the retailer and/or the end user. In representative embodiments, the sealing layer is therefore a polymeric composition that can be sealed to itself or other layers by the application of pressure, and preferably by the application of a combination of heat and pressure. Such heat sealable polymeric compositions include polyolefins, and therefore the sealing layer may comprise, by weight, at least about 70%, at least about 85%, or substantially all (e.g., at least about 95%) of a polyolefin such as polyethylene (PE), polypropylene (PP), propylene ethylene (PPE) copolymers or otherwise copolymers of ethylene or propylene with another olefin (e.g., butane, pentene, hexane, octane, methyl or pentene, and particularly an alpha-olefin), or a blend of polyolefins. Representative blends of polyolefins suitable for one or more layers of the sealing layer include polyethylene/polypropylene blends and polyethylene/ethylene vinyl acetate (EVA) blends, with relative amounts of blending components determining the overall chemical characteristics of a given blend, including its compatibility with adjacent layers. Also included in the definition of polyolefins are copolymers of olefins with non-olefinic comonomers as discussed above with respect to the base film.

According to representative embodiments, the sealing layer comprises polyethylene in the percentages given above. The polyethylene may be high density polyethylene (HDPE), medium density polyethylene (MDPE), low density polyethylene (LDPE), very low density polyethylene (VLDPE), and/or ultra low density polyethylene (ULDPE). A preferred polyolefin for use in the sealing layer is linear low density polyethylene (LLDPE), optionally in the form of a blend with EVA. According to particular embodiments, the sealing layer has a thickness generally from about 10 m to about 100 µm, and often from about 25 µm to about 60

μm, in order to promote good heat sealing characteristics and other properties, including overall material strength.

Additional Layers

The multi-layer laminate material may comprise layers in addition to those discussed above, in order to impart a desired functionality for a given application. A barrier layer may be added, for example, to reduce oxygen diffusion from ambient air through the laminate material and into the product. Representative barrier layers include vinylidene chloride copolymers (e.g., vinylidene chloride methyl acrylate copolymer and vinylidene chloride vinyl chloride copolymer), polyamides (e.g., nylon-MXD6, nylon 6, nylon 6,6), ethylene vinyl alcohol copolymer, and foil and glass coated films (e.g., Toppan® GL-AEH). Abuse or tear resistant layers may also be added, and these include, for example, biaxially oriented nylon, oriented polypropylene, and polyethylene terephthalate (PET), as well as elastomers and blends of elastomers (e.g., a blend of an elastomer and HDPE). Representative elastomers include polyisobutylene, rubber modified styrene, and butadiene-styrene copolymers.

Dispensing Tube with Tube Head

In forming a dispensing tube as described herein, an end piece or tube head may be attached to an open end of a tube comprising a multi-layer laminate as described above. A representative dispensing tube is depicted in FIG. 3, comprising tube head 50 attached to a tube formed of multi-layer laminate material 10 at overlapping portions. Dispensing tube 100' may therefore include various sections, such as skirt section C, formed by multi-layer laminate 10, as well as neck section A and shoulder section B, formed by tube head 50. Neck section A defines dispensing outlet 60, which may have generally cylindrical shape (without considering the protruding threads 55) as depicted in FIG. 3, or may have a tapered nozzle shape to allow for more targeted dispensing of the tube contents, or otherwise may have a different shape. The outer periphery of neck section A, surrounding dispensing outlet 60, provides a sealing surface 70, which may be adapted for attachment of a removable seal (not shown), such as an adhesive foil seal that is removed prior to the first use of the contained product.

The end piece or tube head may also include a removable lid or cap (not shown in FIG. 2), or otherwise a lid or cap that is formed integrally with the end piece or tube head. In the particular dispensing tube 100' depicted in FIG. 3, spiral threads 55 are included in neck section A of tube head 50, which can engage threads of a removable cap (not shown). Generally, tube head 50, in neck and shoulder sections A, B, is of relatively more rigid material, for example a hard polyolefin such as polyethylene or polypropylene of sufficient thickness to impart rigidity, compared to multi-layer laminate material 10. This rigidity prevents dispensing outlet 60 from becoming crushed or otherwise closed, before all or substantially all of the contained product is dispensed.

Tube head 50 may be formed by injection molding and may include, in a lower portion of shoulder section B, an extended overlap region 65 for bonding with multi-layer laminate material 10. Overlap region 65 may be in the form of a downward-extending flange that provides a surface upon which multi-layer laminate material 10 can be heat sealed or otherwise chemically or mechanically attached. According to one embodiment, the thickness of tube head 50 is the same or substantially the same as the thickness of multi-layer laminate material 10. Alternatively, as depicted in FIG. 3, overlap region 65 is a region of reduced thickness of tube head 50, compared to the immediately surrounding region in shoulder section B. In this case, the combined thickness of tube head 50 in overlap region 65 and multi-layer laminate material 10 may be the same or substantially the same as the thickness of tube head 50 throughout the rest of shoulder section B (not including overlap region 65).

According to a representative embodiment for forming tube head 50, molten polymeric material of tube head 50 is injected into a suitable mold, and tube head 50, once formed, is attached by heat sealing to an upper portion of multi-layer laminate material 10, namely where it overlaps tube head 50 in overlap region 65. In this case, the formation of tube head 50 and its attachment to multi-layer laminate material 10 are distinct steps, in which, for example, the tube head 50 may be "preformed" prior to being bonded to multi-layer laminate material 10. When the polymeric material is injected into the mold used to form tube head 50, this mold does not contain multi-layer laminate material 10. The attachment between multi-layer laminate material 10, which forms skirt section C, at overlap region 65 of tube head 50, is carried out in a different step, following the complete formation of tube head 50. The preformed tube head 50 is therefore formed with overlap region 65 suitable for engagement with multi-layer laminate 10 to form dispensing tube 100'. This separate formation of tube head 50 and its subsequent joining to multi-layer laminate material 10 allows for mass production of tube head 50 and construction/filling of dispensing tubes in locations that do not have access to complex, direct injection machinery. This allows for a simplified construction and the implementation of effective manufacturing techniques.

Alternatively, tube head 50 may be directly injection molded onto multi-layer laminate material 10. In this case, formation of tube head 50 and its attachment to multi-layer laminate material 10 occur simultaneously. Such a direct injection technique may, according to one embodiment, involve injecting the molten polymeric material of tube head 50 into a mold having a sprue section over the dispensing end of the tube. The sprue, which is required during formation to ensure that the polymeric material is provided along the axis of symmetry of the end piece and thereby distributes evenly, is cut away before the dispensing tube is finished. This even radial distribution of the polymeric material is important for providing accurate joining between tube head 50 and multi-layer laminate material 10, and the use of a sprue can additionally allow some simplification of the tooling required.

Overall, aspects of the invention are directed to multi-layer laminate materials having improved filling properties and comprising, in order: (a) a base film having one or more layers (any of which may comprise, for example, a polyolefin), (b) an aluminum foil layer, and (c) a sealing layer. The aluminum foil layer has a tensile strength of at least about 70 megapascals (MPa), thereby providing the advantages discussed above, particularly with respect to the use of the laminate material in packaging (e.g., filling) operations. According to representative embodiments, the multi-layer laminate material may consist of only the base film and these two layers, having the representative base film and layer thicknesses as described above. Alternatively, the multi-layer laminate material may consist of the base film and the particular layer configuration as depicted in FIG. 1, namely the compatibility layer adjacent the base film, followed by the first adhesive layer, the foil layer, the second adhesive layer, and the sealing layer. Whether the laminate consists or comprises these layers (with optional additional layers being added), in particular embodiments the base film has a thickness, from about 100 μm to about 150 μm, the first adhesive layer has a thickness from about 15 μm to about 40 μm, the foil layer has a thickness from 10 to about 15 microns, the second adhesive layer has a thickness from about 15 μm to about 40 μm, and the sealing layer has a thickness from about 25 μm to about 60 μm.

In general, any of the multi-layered materials described herein can be made by processes that include lamination, or otherwise include extrusion, coextrusion, blown extrusion, cast extrusion, tubular water quenched extrusion, extrusion coatings, and heat sealing. Combinations of processes can be employed, for example in the embodiment in which the base film is made by the blown extrusion of the multiple layers of the base film, and the base film is laminated to the compatibility layer, first adhesive layer, foil layer, second adhesive layer, and sealing layer, to provide a multi-layered material according to the embodiment illustrated in FIG. 1.

Those having skill in the art, with the knowledge gained from the present disclosure, will recognize that various changes could be made in these multi-layer materials and their respective layer configurations, without departing from the scope of the present invention.

The following examples are set forth as representative of the present invention. These examples are not to be construed as limiting the scope of the invention as other equivalent embodiments will be apparent in view of the present disclosure and appended claims.

Comparative Example 1

A multi-layer laminate material was made by laminating a coextruded base film to the following layers, in order: (i) a 34 μm compatibility layer, comprising all LDPE, adjacent the base film, (ii) a first 20 μm adhesive layer comprising all EAA, (iii) a 13 μm aluminum foil layer, (iv) a 28 μm second adhesive layer comprising all EAA, and (v) a 41 μm sealant layer comprising all LLDPE. The base film was a 2-layer structure of blown, co-extruded 20 wt-% LDPE and 80 wt-% HDPE. The LDPE served as a print surface for the final multi-layer laminate material. The total thickness of the base film was 114 μm, and therefore the total thickness of the multi-layer laminate material was 250 μm.

In this multi-layer laminate material, the tensile strength of the aluminum foil was less than 50 MPa.

Comparative Example 2

A multi-layer laminate material was made as described in Comparative Example 1, except that the total thickness of the base film was increased from 114 μm to 127 μm and the thickness of the compatibility layer was increased from 34 μm to 51 μm. Therefore, the total thickness of the multi-layer laminate material was increased from 250 μm to 279 μm. Again the tensile strength of the aluminum foil was less than 50 MPa.

Example 1

A multi-layered laminate material was made as described in Comparative Example 1, except that the aluminum foil had a tensile strength of greater than 70 MPa.

The laminate materials described in these examples were tested for their peak load to failure, according to a standard test method using an accepted testing machine. Specifically, the peak load to failure at a machine crosshead speed of 127 mm/min was determined for each of the prepared materials, using a 34 mm×102 mm sample, and the results are summarized in Table 1 below.

TABLE 1

Comparison of Strength for Laminate Materials

| Sample | Comparative Example 1 | Comparative Example 2 | Example 1 |
| --- | --- | --- | --- |
| Total Caliper (μm) | 250 μm | 279 μm | 250 μm |
| Foil Caliper (μm) | 12.7 μm | 12.7 μm | 12.7 μm |
| Measurement #1 | 7.65 | 7.53 | 8.08 |
| Measurement #2 | 8.47 | 8.76 | 8.95 |
| Measurement #3 | 7.84 | 9.97 | 8.95 |
| Measurement #4 | 8.68 | 8.43 | 11.46 |
| Measurement #5 | 8.72 | 9.42 | 8.70 |
| Measurement #6 | N/A | 8.93 | 8.51 |
| Average | 8.27 kg | 8.84 kg | 9.11 kg |
| Standard Deviation | 0.49 | 0.84 | 1.20 |

These results demonstrate that, by using an aluminum foil layer having a tensile strength of at least about 70 MPa, the peak load to failure of the resulting multi-layer laminate material is considerably improved. A peak load to failure improvement was even observed relative to Comparative Example 2, despite the increase in the total material thickness due to the higher weight of the base film and compatibility layer.

The invention claimed is:

1. A multi-layer laminate material comprising, in order:
   (a) a base film having one or more layers of a polyolefin;
   (b) an aluminum foil layer; and
   (c) a sealing layer,
   wherein the aluminum foil layer has a tensile strength from about 70 megapascals (MPa) to about 90 MPa.

2. The laminate material of claim 1, wherein the aluminum foil layer has a thickness from about 6 to about 20 microns (μm).

3. The laminate material of claim 1, wherein the base film has a thickness from about 75 to about 200 μm.

4. The laminate material of claim 1, having a total thickness from about 200 to about 275 μm.

5. The laminate material of claim 1, wherein the sealing layer comprises polyethylene.

6. The laminate material of claim 1, further comprising first and second adhesive layers, disposed, respectively, between (i) the aluminum foil layer and a layer of the polyolefin base film, and (ii) the aluminum foil layer and the sealing layer.

7. The laminate of material claim 6, wherein the first and second adhesive layers comprise olefin-acrylic acid copolymers.

8. The laminate material of claim 6, further comprising a compatibility layer comprising a polyolefin and disposed between a layer of the polyolefin base film and the first adhesive layer.

9. The laminate material of claim 8, wherein the polyolefin compatibility layer comprises low density polyethylene (LDPE).

10. The laminate material of claim 1, having a peak load to failure of at least about 8.0 kg at a crosshead speed of 127 mm/min.

11. A tube comprising the laminate material of claim 1, wherein (i) overlapping portions of the sealing layer and a layer of the polyolefin base film are bonded to form a lap seal over at least a portion of the length of the tube, and wherein (ii) overlapping portions of the sealing layer are bonded to form a fin seal over at least a portion of the width of the tube, the tube optionally comprising a tube head attached to an open end of the tube.

12. A packaged product comprising the tube of claim 11 and containing, in the interior of the tube, an oral or topical product that contacts non-overlapping portions of the sealing layer,
   wherein the product has solid characteristics when disposed in the tube and is removable through an opening in the tube with the application of manual compressive force.

13. The packaged product of claim 12, wherein the oral or topical product is in the form of a gel, a paste, an ointment, a lotion, or a cream.

14. The tube of claim 11, having an interior volume, or containing a product having a volume, from about 150 to about 500 milliliters (ml).

15. A method of preparing a packaged product comprising filling the tube of claim 11, in an automated filling and sealing process, with an oral or topical product that is in the form of a gel, a paste, an ointment, a lotion, or a cream.

16. The method of claim 15, further comprising, prior to filling the tube, preparing the tube from the laminate material of claim 1 by bonding (i) overlapping portions of the sealing layer and a layer of the polyolefin base film to form a lap seal over at least a portion of the length of the tube, and (ii) overlapping portions of the sealing layer to form a fin seal over at least a portion of the width of the tube.

17. The method of claim 16, wherein the bonding of (i) and (ii) is carried out by applying a combination of heat and pressure between the overlapping portions.

18. The method of claim 16, further comprising, prior to or after filling the tube, bonding a tube head of a rigid plastic material to an open end of the tube.

19. A multi-layer material comprising, in order:
(a) a base film having one or more layers of a polyolefin;
(b) an aluminum foil layer; and
(c) a sealing layer,
   wherein the aluminum foil layer has a tensile strength from about 70 megapascals (MPa) to about 90 MPa.

20. The multi-layered material of claim 19, wherein the material is made by a process selected from the group consisting of lamination, extrusion, coextrusion, blown extrusion, cast extrusion, tubular water quenched extrusion, extrusion coatings, heat sealing, and combinations thereof.

* * * * *